(12) United States Patent
Zeng et al.

(10) Patent No.: US 12,166,241 B2
(45) Date of Patent: Dec. 10, 2024

(54) BATTERY CELL, BATTERY, ELECTRIC APPARATUS, AND MANUFACTURING METHOD AND SYSTEM OF BATTERY CELL

(71) Applicant: CONTEMPORARY AMPEREX TECHNOLOGY (HONG KONG) LIMITED, Hong Kong (CN)

(72) Inventors: Yuqun Zeng, Ningde (CN); Wenlong Kang, Ningde (CN); Chengyou Xing, Ningde (CN); Peng Wang, Ningde (CN); Quankun Li, Ningde (CN); Huasheng Su, Ningde (CN); Wenzhong Liu, Ningde (CN)

(73) Assignee: Contemporary Amperex Technology (Hong Kong) Limited, Hong Kong (CN)

( * ) Notice: Subject to any disclaimer, the term of this patent is extended or adjusted under 35 U.S.C. 154(b) by 0 days.

(21) Appl. No.: 17/815,214

(22) Filed: Jul. 27, 2022

(65) Prior Publication Data

US 2022/0359958 A1 Nov. 10, 2022

Related U.S. Application Data

(63) Continuation of application No. PCT/CN2020/119692, filed on Sep. 30, 2020.

(51) Int. Cl.
*H01M 50/533* (2021.01)
*H01M 50/166* (2021.01)
(Continued)

(52) U.S. Cl.
CPC ....... *H01M 50/533* (2021.01); *H01M 50/166* (2021.01); *H01M 50/543* (2021.01); *H01M 50/593* (2021.01); *H01M 2220/20* (2013.01)

(58) Field of Classification Search
CPC ............. H01M 50/166; H01M 50/533; H01M 50/543; H01M 50/593; H01M 2220/20;
(Continued)

(56) References Cited

U.S. PATENT DOCUMENTS 4,855,195 A * 8/1989 Georgopoulos .... H01M 50/581
429/7
5,188,909 A * 2/1993 Pedicini .............. H01M 50/581
429/7
(Continued)

FOREIGN PATENT DOCUMENTS

CN 105374961 A 3/2016
CN 105470413 A 4/2016
(Continued)

OTHER PUBLICATIONS

International Search Report received in PCT Application PCT/CN2020/119692 on Jul. 9, 2021.
(Continued)

*Primary Examiner* — Michael L Dignan
(74) *Attorney, Agent, or Firm* — Kilpatrick Townsend & Stockton LLP

(57) ABSTRACT

Embodiments provide a battery cell, a battery, an electric apparatus, and a manufacturing method and system of battery cell. In some embodiments, the battery cell includes a housing, an electrode assembly, and an end cover assembly. The housing provides an opening. The electrode assembly is disposed in the housing. The electrode assembly includes a body portion, a tab, and an isolation portion. The tab extends from an end of the body portion to the opening. The isolation portion is disposed on a periphery of the tab. The end cover assembly is configured to cover the opening. The end cover assembly includes an end cover and a first insulator. The end cover is configured to cover the opening and is connected to the housing. The first insulator is
(Continued)

disposed on a side of the end cover proximate to an inside of the housing. The first insulator has a concave portion.

15 Claims, 16 Drawing Sheets

(51) Int. Cl.
*H01M 50/543* (2021.01)
*H01M 50/593* (2021.01)

(58) Field of Classification Search
CPC ... H01M 50/152; H01M 50/55; H01M 50/184
See application file for complete search history.

(56) References Cited

U.S. PATENT DOCUMENTS

| | | | | |
|---|---|---|---|---|
| 6,443,999 | B1 * | 9/2002 | Cantave | H01M 50/474 429/247 |
| 7,687,189 | B2 * | 3/2010 | Wu | H01M 50/171 429/57 |
| 2009/0081532 | A1 * | 3/2009 | Kaplin | H01M 50/107 429/185 |
| 2013/0260201 | A1 * | 10/2013 | Marple | H01M 4/08 29/623.5 |
| 2020/0044289 | A1 | 2/2020 | Pasma et al. | |
| 2022/0094020 | A1 * | 3/2022 | Kasahara | H01M 50/103 |
| 2023/0111952 | A1 * | 4/2023 | Lim | H01M 50/533 429/129 |

FOREIGN PATENT DOCUMENTS

| | | | | |
|---|---|---|---|---|
| CN | 107482156 | A * | 12/2017 | ........ H01M 10/0587 |
| CN | 108305961 | A | 7/2018 | |
| CN | 110265616 | A | 9/2019 | |
| CN | 209709033 | U | 11/2019 | |
| CN | 209896161 | U | 1/2020 | |
| CN | 210743995 | U | 6/2020 | |
| CN | 211017134 | U | 7/2020 | |
| CN | 212011114 | U | 11/2020 | |
| JP | 2015099699 | A | 5/2015 | |
| JP | 2018006113 | A | 1/2018 | |
| KR | 20130019713 | A * | 2/2013 | |
| WO | 2019148662 | A1 | 8/2019 | |
| WO | 2020110178 | A1 | 6/2020 | |

OTHER PUBLICATIONS

The first office action received in the corresponding Chinese Application 202080096129.0, mailed Aug. 30, 2023.
The extended European search report received in the corresponding European application 20955801.4, mailed Dec. 1, 2023.
Notice of Reasons of Refusal received in the corresponding Japanese Application 2022-543113, mailed Jul. 31, 2023.

* cited by examiner

BATTERY CELL, BATTERY, ELECTRIC APPARATUS, AND MANUFACTURING METHOD AND SYSTEM OF BATTERY CELL

CROSS-REFERENCE TO RELATED APPLICATIONS

This application is a continuation of International Application PCT/CN2020/119692, filed on Sep. 30, 2020 and entitled "BATTERY CELL, BATTERY, ELECTRIC APPARATUS, AND MANUFACTURING METHOD AND SYSTEM OF BATTERY CELL", which is incorporated herein by reference in its entirety.

TECHNICAL FIELD

This application relates to the field of battery technologies, and in particular, to a battery cell, a battery, an electric apparatus, and a manufacturing method and system of battery cell.

BACKGROUND

Rechargeable batteries have been widely used in electric vehicles, mobile devices, or electric tools due to the advantages of high energy density, high power density, large cycle count, long storage time, and the like. A battery includes a battery cell. However, during use of the battery cell, there is a problem of short circuit, which affects use safety of the battery cell.

SUMMARY

Embodiments provide a battery cell, a battery, an electric apparatus, and a manufacturing method and system of battery cell, to address short circuit of the battery cell affecting use safety.

An embodiment provides a battery cell, including a housing, an electrode assembly, and an end cover assembly. The housing provides an opening. The electrode assembly is disposed in the housing. The electrode assembly includes a body portion, a tab, and an isolation portion. The tab extends from an end of the body portion to the opening. The isolation portion is disposed on a periphery of the tab. The end cover assembly is configured to close the opening. The end cover assembly includes an end cover and a first insulator. The end cover is configured to cover the opening and is connected to the housing. The first insulator is disposed on a side of the end cover proximate to an inside of the housing. The first insulator has a concave portion. At least part of the tab is accommodated in the concave portion. The first insulator is configured to abut against the isolation portion to isolate the tab from the housing.

In an embodiment, the first insulator includes a body and an extension portion that are interconnected, the body is configured to be connected to the end cover, the extension portion extends and protrudes from the body to the electrode assembly to form the concave portion, the extension portion is disposed on the periphery of the tab, and the extension portion abuts against the isolation portion. Because the first insulator has the extension portion, during assembling, the extension portion of the first insulator can insert into a gap between the tab and the housing, so that the extension portion can guide the tab into the concave portion of the first insulator accurately. This reduces the possibility that the tab is deformed by the first insulator applying a pressing force to the tab during assembling, and allows the extension portion to protect and limit the tab earlier during assembling.

In an embodiment, the extension portion is located on a side of the isolation portion closer to the end cover, and the extension portion abuts against the isolation portion in a direction leaving the end cover. The extension portion can limit and constrain the isolation portion, reducing the possibility of the isolation portion moving in a direction approaching or leaving the end cover, thereby reducing the possibility of the extension portion and the isolation portion being out of the abutting state due to the isolation portion moving in the direction approaching or leaving the end cover. In addition, the extension portion can also limit and constrain the electrode assembly, reducing the possibility of the electrode assembly moving in a direction approaching or leaving the end cover.

In an embodiment, the extension portion is of a continuously extending closed-loop structure. Because an end surface of the extension portion farther away from the end cover is of a closed-loop structure, the extension portion can provide protective isolation for the tab at an entire periphery of the tab, further improving the isolation effect. Alternatively, the extension portion is of an annular structure with a notch. The notch of the extension can provide an avoidance space.

In an embodiment, the isolation portion is annular. The isolation portion integrally sleeves the periphery of the tab, so that the isolation portion can form protection for the tab in an entire circumferential direction of the tab.

In an embodiment, the tab includes a step portion, where the step portion includes a first side surface, a transition surface, and a second side surface, the first side surface is proximate to the body portion, the transition surface connects the first side surface and the second side surface, the transition surface faces toward the end cover, a minimum radial dimension of the first side surface is greater than a maximum radial dimension of the second side surface, and at least part of an inner wall of the concave portion surrounds the second side surface. A part of the tab corresponding to the second side surface is located in the concave portion. In this way, part of the tab may be located in the concave portion of the first insulator, which can shorten, for a battery cell with a same capacity, an overall dimension of the battery cell in an axial direction of the electrode assembly, thereby helping improve an energy density of the battery cell.

In an embodiment, the extension portion surrounds the second side surface, and the isolation portion is disposed on the transition surface. The end surface of the extension portion is opposite the transition surface and abuts against the isolation portion, which can reduce the possibility of the electrode assembly moving in the direction approaching or leaving the end cover.

In an embodiment, the electrode assembly includes a first electrode plate, a second electrode plate, and a separator, where the first electrode plate and the second electrode plate each have a coated area and an uncoated area, a part of the electrode assembly corresponding to the coated areas of the first electrode plate and the second electrode plate is the body portion, the uncoated area of the first electrode plate or the second electrode plate forms the tab, the separator is configured to isolate the first electrode plate from the second electrode plate, and the isolation portion is a part of the separator extending beyond the body portion and located on the periphery of the tab. This is beneficial to reduce a quantity of parts used and difficulty of assembling. Because the separator is of an integral structure, the formed isolation portion is not easy to fall off.

In an embodiment, the electrode assembly further includes a second insulator, where the second insulator surrounds an abutting area between the first insulator and the isolation portion to isolate the abutting area from the housing. An abutting area between the extension portion and the isolation portion and the second insulator can form a structure that provides double isolation and protection for the tab, which can further reduce the possibility of short-circuiting the tab and the housing due to the tab coming into contact with the housing.

In an embodiment, the second insulator abuts against an outer surface of the first insulator facing toward the housing and is in contact with the isolation portion. A contact area may be formed between the second insulator and the first insulator, and a contact area may be formed between the second insulator and the isolation portion, so that the second insulator can block a conductive impurity.

In an embodiment, the outer surface has a guide slope, and the guide slope is inclined to the concave portion in a direction leaving the end cover. During assembling of the end cover assembly after the electrode assembly having the second insulator is placed into the housing, under the guidance of the guide slope, a part of the first insulator corresponding to the guide slope may easily enter a space limited by the second insulator.

In an embodiment, the second insulator is adhered to the outer surface, which improves connection reliability and stability between the second insulator and the first insulator.

In an embodiment, an area of the second insulator abutting against the outer surface is closer to the end cover than the tab. This can reduce the possibility of a conductive impurity entering the tab from a gap between the first insulator and the second insulator that are not in contact with each other during assembling.

In an embodiment, the end cover assembly further includes a connecting piece, where the connecting piece is accommodated in the concave portion, the connecting piece includes a first connecting portion, the first connecting portion is configured to be connected to the tab, and the first insulator and the electrode assembly press the first connecting portion. The first connecting portion is not easy to move relative to the electrode assembly, which can reduce the possibility that the first connecting portion and the tab are disconnected due to the first connecting portion moving relative to the electrode assembly.

The battery cell in an embodiment includes the housing, the electrode assembly, and the end cover assembly. The concave portion of the first insulator of the end cover assembly accommodates the tab of the electrode assembly. In addition, the first insulator and the isolation portion of the electrode assembly abut against each other to form an isolation structure on the periphery of the tab, thereby isolating the tab from the housing. In this way, during use of the battery cell, when the tab is deformed by releasing its own elastic restoring force, if the tab comes into contact with the first insulator and the isolation portion, the tab is blocked by the first insulator and the isolation portion, thereby effectively reducing the possibility of short circuit caused by the tab being in overlapping contact with the housing. In addition, because the first insulator and the isolation portion abut against each other, and at least part of the tab is accommodated in the concave portion of the first insulator, the tab may be protected by the first insulator and the isolation portion, so that an external conductive impurity is not easy to come into contact with the tab, thereby reducing the possibility of short-circuiting the tab and the housing due to the tab and the housing being conductively connected by the conductive impurity.

An embodiment further provides a battery, including the battery cell according to the foregoing embodiment.

An embodiment further provides an electric apparatus, including the battery cell according to the foregoing embodiment, where the battery cell is configured to provide electric energy.

An embodiment further provides a manufacturing method of the battery cell according to the foregoing embodiment, including:

placing an electrode assembly having a body portion, a tab, and an isolation portion into a housing having an opening, where the tab extends from an end of the body portion to the opening, and the isolation portion is disposed on a periphery of the tab; and assembling an end cover assembly having an end cover and a first insulator with the housing, where the end cover covers the opening and is connected to the housing, the first insulator is located on a side of the end cover proximate to an inside of the housing, the first insulator has a concave portion, at least part of the tab is accommodated in the concave portion, and the first insulator abuts against the isolation portion to isolate the tab from the housing.

An embodiment further provides a manufacturing system of the battery cell according to the foregoing embodiment, including:

a first assembling apparatus, configured to place an electrode assembly having a body portion, a tab, and an isolation portion into a housing having an opening, where the tab extends from an end of the body portion to the opening, and the isolation portion is disposed on a periphery of the tab; and a second assembling apparatus, configured to assemble an end cover assembly having an end cover and a first insulator with the housing, where the end cover covers the opening and is connected to the housing, the first insulator is located on a side of the end cover proximate to an inside of the housing, the first insulator has a concave portion, at least part of the tab is accommodated in the concave portion, and the first insulator abuts against the isolation portion to isolate the tab from the housing.

BRIEF DESCRIPTION OF DRAWINGS

To describe the technical solutions in the embodiments more clearly, the following briefly describes the accompanying drawings required for describing the embodiments. Apparently, the accompanying drawings in the following description show merely some embodiments, and a person of ordinary skill in the art may still derive other drawings from the accompanying drawings without creative efforts.

DETAILED DESCRIPTION OF EMBODIMENTS

Figure 1:
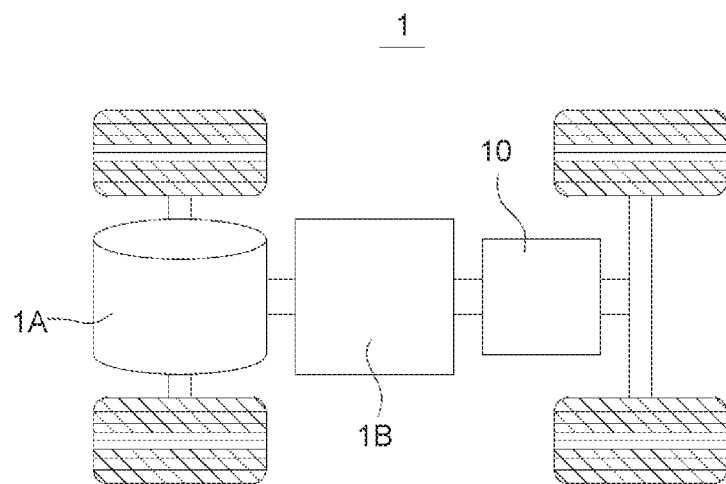
FIG. 1 is a schematic structural diagram of a vehicle disclosed in an embodiment.

The following further describes various embodiments in detail with reference to the accompanying drawings and implementations. The detailed description and accompanying drawings of the following embodiments are used to exemplarily illustrate the principle of this application, but are not intended to limit the scope of the present disclosure, that is, the present disclosure is not limited to the described embodiments.

Herein, it should be noted that, unless otherwise stated, "a plurality of" means two or more; and the orientations or positional relationships indicated by the terms "upper", "lower", "left", "right", "inside", "outside", and the like are merely intended to help the descriptions of this application and simplify the descriptions other than indicate or imply that the apparatuses or components must have specific orientations, or be constructed and manipulated with specific orientations, and therefore shall not be construed as limitations on this application. In addition, the terms "first", "second", and "third", and the like are merely intended for a purpose of description, and shall not be understood as an indication or implication of relative importance. "Vertical" means being vertical with an allowable range of error other than being strictly vertical. "Parallel" means being parallel with an allowable range of error other than being strictly parallel.

The orientation terms appearing in the following description all are directions shown in the figures, and do not limit the specific structure of the application. In the descriptions of this application, it should be further noted that unless otherwise specified and defined explicitly, the terms "mounted", "interconnected", and "connected" should be understood in their general senses. For example, the terms may be fixedly connected, or detachably connected, or integrally connected, may be directly connected, or indirectly connected through an intermediate medium. A person of ordinary skill in the art can understand specific meanings of these terms in this application based on specific situations.

After noticing the problem of short circuit in the existing battery cells, the inventor(s) has analyzed a structure of the battery cell. A battery cell includes a housing, an electrode assembly, an end cover, an electrode terminal, and a connecting piece. The electrode assembly is disposed in the housing. The end cover is connected to the housing. The electrode terminal is disposed on the end cover. The electrode assembly includes a body portion and a tab. The tab extends from the body portion in a direction leaving the body portion. The connecting piece connects the electrode terminal and the tab of the electrode assembly. The inventor(s) has found that the tab of the battery cell is in overlapping contact with the housing, which leads to the short circuit of the battery cell. The inventor(s) has found through further research that the tab of the electrode assembly is processed through bending or flattening, so that the tab is deformed to meet assembling requirements, and therefore the tab itself can accumulate elastic restoring forces. After the battery cell is assembled, the tab does not overlap the housing to cause the short circuit. However, after use for a period of time, the tab releases the elastic restoring forces accumulated by itself and springs back, resulting in short circuit caused by the tab overlapping the housing.

Based on the foregoing problem discovered by the inventor(s), the inventor(s) improves the structure of the battery cell by having the insulator of the end cover assembly abutting against the isolation portion outside the tab to reduce the possibility of the tab overlapping the housing. The following further describes the embodiments.

For better understanding of this application, the following describes the embodiments with reference to FIG. 1 to FIG. 20.

An embodiment provides an electric apparatus using a battery 10 as a power supply. The electric apparatus may be, but is not limited to, a vehicle, a ship, an aircraft, or the like. As shown in FIG. 1, an embodiment provides a vehicle 1. The vehicle 1 may be an oil-fueled vehicle, a gas-fueled vehicle, or a new energy vehicle. The new energy vehicle may be a battery electric vehicle, a hybrid electric vehicle, an extended-range electric vehicle, or the like. In this embodiment, the vehicle 1 may include a motor 1a, a controller 1b, and a battery 10. The controller 1b is used to control the battery 10 to supply power to the motor 1a. The motor 1a is connected to wheels through a transmission mechanism to drive the vehicle 1 to run. The battery 10 may be used as a driving power supply of the vehicle 1 to replace or partially replace fuel oil or natural gas to provide driving power for the vehicle 1. In an example, the battery 10 may be disposed at the bottom, the front, or the rear of the vehicle 1. The battery 10 may be configured to supply electricity to the vehicle 1. In an example, the battery 10 may be used as an operating power supply for the vehicle 1 and applied to a circuit system of the vehicle 1. For example, the battery 10 may be configured to meet power usage requirements of the vehicle 1 for starting, navigating, and operating.

Figure 2:
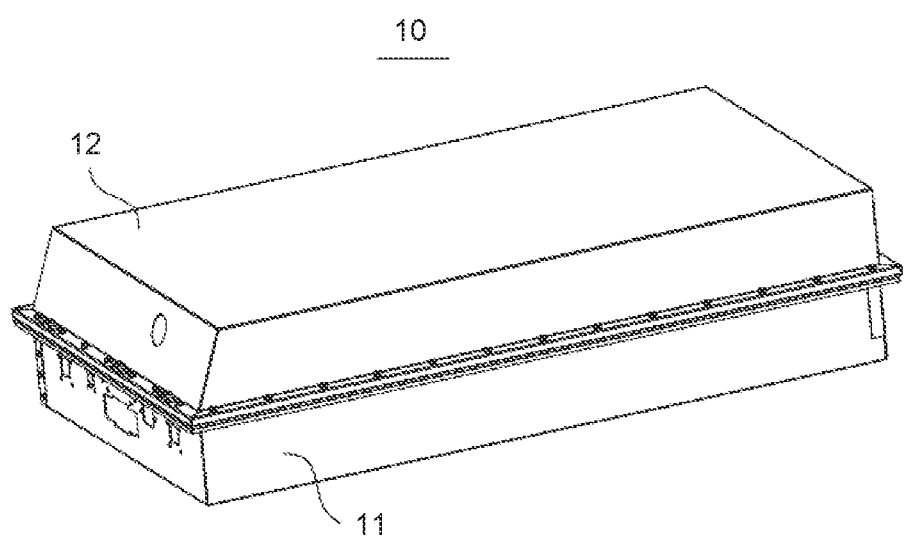
FIG. 2 is a schematic structural diagram of a battery disclosed in an embodiment.
Figure 3:
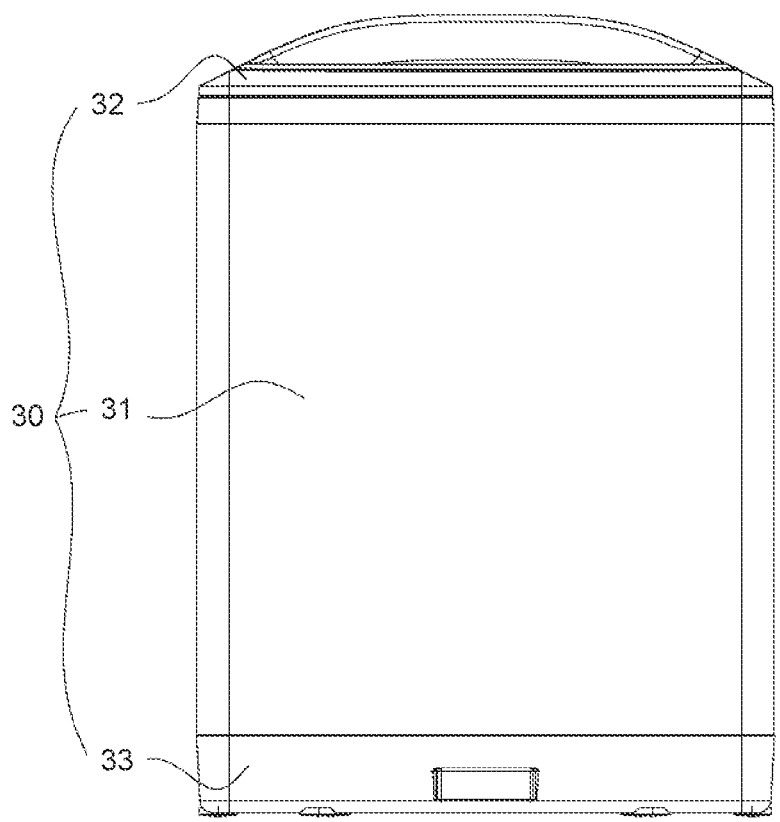
FIG. 3 is a schematic structural diagram of a battery module disclosed in an embodiment.

As shown in FIG. 2 and FIG. 3, the battery 10 includes a box body. The box body is not limited to a specific type. The box body may be a frame-shaped box body, a disk-shaped box body, a box-shaped box body, or the like. For example, the box body includes a first portion 11 and a second portion 12 that is engaged to the first portion 11. The first portion 11 is engaged to the second portion 12 to form an accommodating portion. The battery 10 includes a plurality of battery cells 40. The plurality of battery cells 40 may form the battery 10, or the plurality of battery cells 40 may first form battery modules 20, and then the plurality of battery modules 20 form the battery 10. FIG. 3 illustratively shows a battery module 20 according to an embodiment. The battery module 20 is disposed in the accommodating portion of the box body.

In some embodiments, to meet different power usage requirements, the battery 10 may include a plurality of battery cells 40. The plurality of battery cells 40 may be connected in series, parallel, or series and parallel, and being connected in series and parallel means a combination of series and parallel connections. In other words, the plurality of battery cells 40 may be directly disposed in the accommodating portion of the box body to form the battery 10. The battery cell 40 may be of a cylindrical structure or a rectangular structure with six surfaces, and an external structure of the battery cell 40 is not limited herein. In the embodiments, the battery cell 40 is described by using an example in which the battery cell 40 is of a cylindrical structure, but this does not limit the protection scope of this application.

Figure 4:
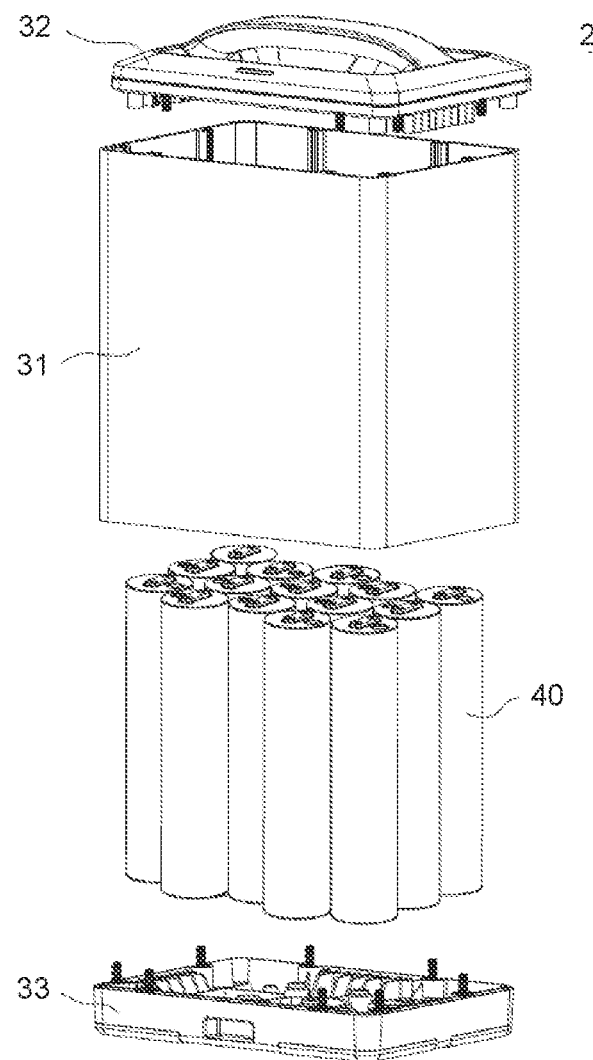
FIG. 4 is a schematic structural exploded view of a battery module disclosed in an embodiment.

As shown in FIG. 3 and FIG. 4, the battery module 20 includes a shell 30 and the battery cell 40 disposed in the shell 30. In an example, the shell 30 includes a barrel body 31, a first cover body 32, and a second cover body 33. The first cover body 32 and the second cover body 33 are respectively disposed on two ends of the barrel body 31. The first cover body 32 and the second cover body 33 are detachably connected to the barrel body 31. For example, the first cover body 32 and the second cover body 33 are snap-connected to the barrel body 31 or connected to the barrel body 31 by using a screw. The barrel body 31, the first cover body 32, and the second cover body 33 are assembled to form an accommodating space. The battery cell 40 is disposed in the accommodating space of the shell 30.

Figure 5:
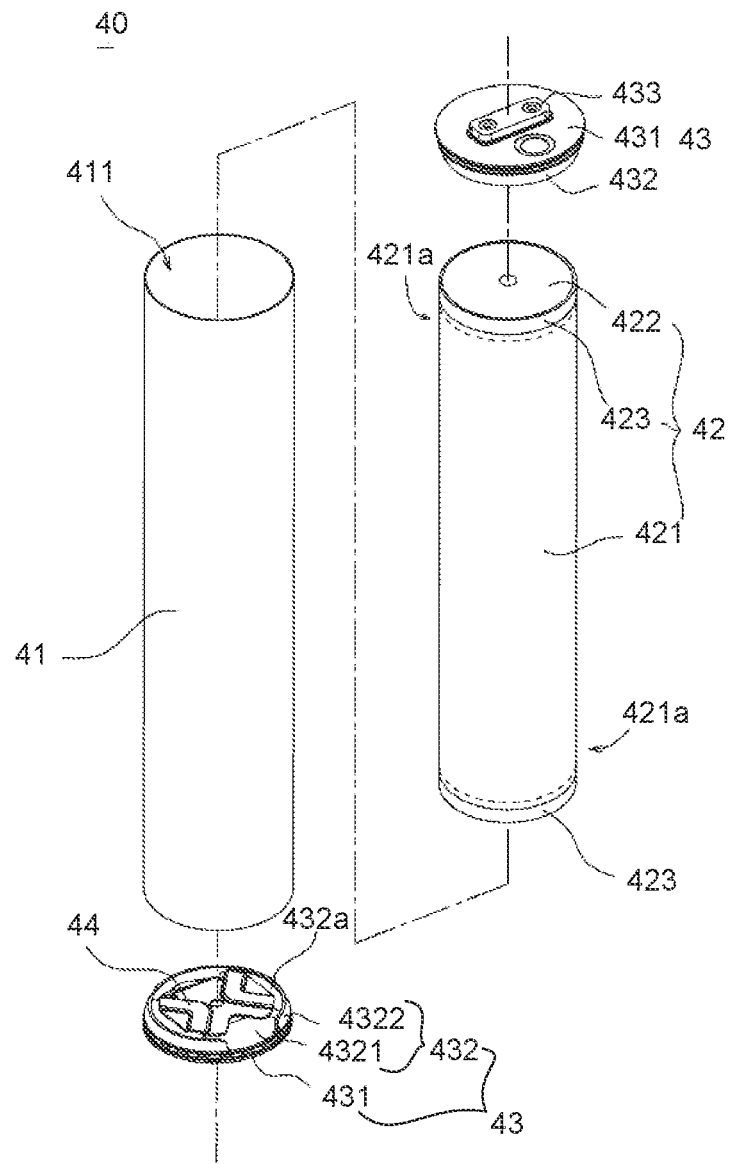
FIG. 5 is a schematic structural exploded view of a battery cell disclosed in an embodiment.

As shown in FIG. 5, the battery cell 40 in this embodiment includes a housing 41 and an electrode assembly 42 disposed in the housing 41. The housing 41 in this embodiment is of a barrel-shaped structure. The housing 41 has an inner space for accommodating the electrode assembly 42 and an electrolyte, and an opening 411 communicating with the inner space. The electrode assembly 42 may be placed into the housing 41 from the opening 411 of the housing 41. The housing 41 may be made of materials such as aluminum, aluminum alloy, or plastic. The electrode assembly 42 includes a body portion 421 and a tab 422. The body portion 421 has an end 421a. The electrode assembly 42 is disposed in the housing 41, the end 421a of the body portion 421 faces toward the opening 411 of the housing 41, and the tab 422 extends from the end 421a of the body portion 421 to the opening 411 of the housing 41.

As shown in FIG. 5, the battery cell 40 in this embodiment further includes an end cover assembly 43 and a connecting piece 44. The end cover assembly 43 is configured to close the opening 411 of the housing 41. The end cover assembly 43 includes an end cover 431, a first insulator 432, and an electrode terminal 433. The end cover 431 is configured to cover the opening 411 of the housing 41 and is connected to the housing 41. For example, the end cover 431 may be connected to the housing 41 through welding. The first insulator 432 and the electrode terminal 433 are both disposed on the end cover 431. The first insulator 432 is disposed on a side of the end cover 431 proximate to an inside of the housing 41. The first insulator 432 has a concave portion 432a. A surface of the first insulator 432 farther away from the end cover 431 is recessed toward the end cover 431 to form the concave portion 432a, and an opening of the concave portion faces toward the electrode assembly 42. The electrode terminal 433 is electrically connected to the electrode assembly 42 through the connecting piece 44. In an example, a quantity of end cover assemblies 43 and a quantity of connecting pieces 44 are both 2. Each of two opposite ends of the electrode assembly 42 is correspondingly provided with one end cover assembly 43 and one connecting piece 44.

Figure 6:
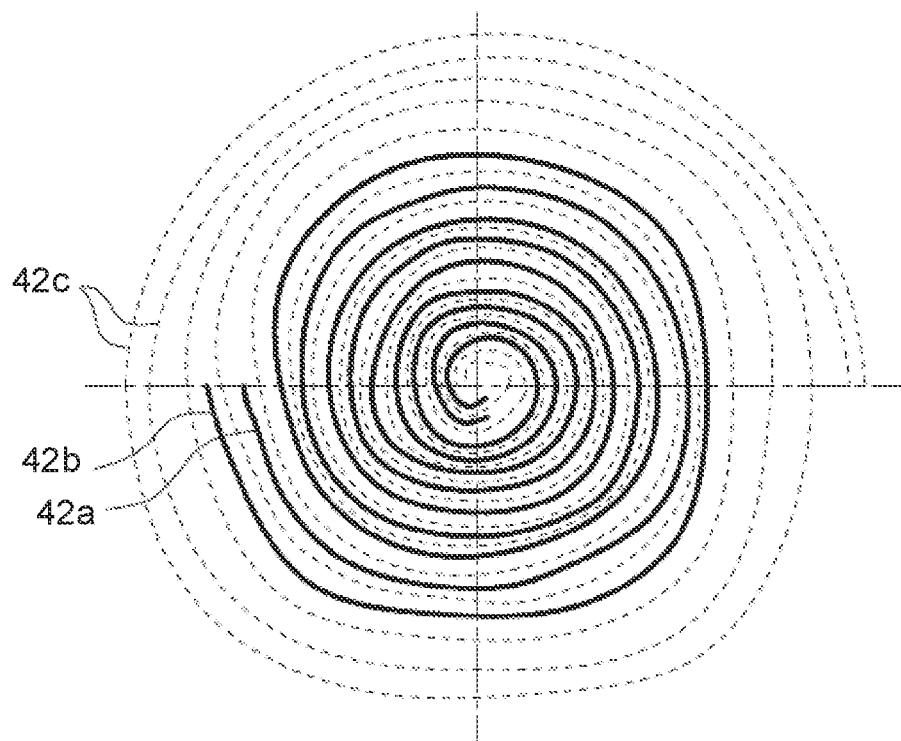
FIG. 6 is a schematic structural diagram of an electrode assembly disclosed in an embodiment.

As shown in FIG. 6, the electrode assembly 42 in this embodiment may be formed by winding a first electrode plate 42a, a second electrode plate 42b, and a separator 42c, where the separator 42c is an insulator between the first electrode plate 42a and the second electrode plate 42b. The separator 42c is configured to insulate and isolate the first electrode plate 42a from the second electrode plate 42b to prevent the first electrode plate 42a from coming into contact with the second electrode plate 42b. The first electrode plate 42a and the second electrode plate 42b each have a coated area and an uncoated area. An active material of the first electrode plate 42a is applied to the coated area of the first electrode plate 42a, and an active material of the second electrode plate 42b is applied to the coated area of the second electrode plate 42b. On the coated area, the active material is applied to a current collector formed by a metal sheet, and no active material is applied to the uncoated area. A part of the electrode assembly 42 corresponding to the coated areas of the first electrode plate 42a and the second electrode plate 42b is the body portion 421. The uncoated area of the first electrode plate 42a or the uncoated area of the second electrode plate 42b forms the tab 422. The body portion 421 has two ends 421a arranged opposite each other. The tab 422 extends from one end 421a of the body portion 421. The tab 422 is of a multi-layer structure. For example, the uncoated areas of the first electrode plate 42a are stacked to form a positive tab, and the uncoated areas of the second electrode plate 42b are stacked to form a negative tab. The positive tab and the negative tab each extend from an end 421a of the body portion 421. In a case that the first electrode plate 42a, the second electrode plate 42b, and the separator 42c are wound together, the separator 42c alone is wound for a predetermined quantity of turns at the end of the winding process, so that the separator 42c extending beyond the first electrode plate 42a and the second electrode plate 42b can wrap the first electrode plate 42a and the second electrode plate 42b. In a direction of a winding axis of the electrode assembly 42, a size of the separator 42c is greater than a size of the coated area of the first electrode plate 42a, and also greater than a size of the coated area of the second electrode plate 42b. Therefore, in the direction of the winding axis of the electrode assembly 42, part of the separator 42c of the electrode assembly 42 extends beyond the body portion 421, and part of the separator 42c extending beyond the body portion 421 is located on a periphery of the tab 422.

Figure 7:
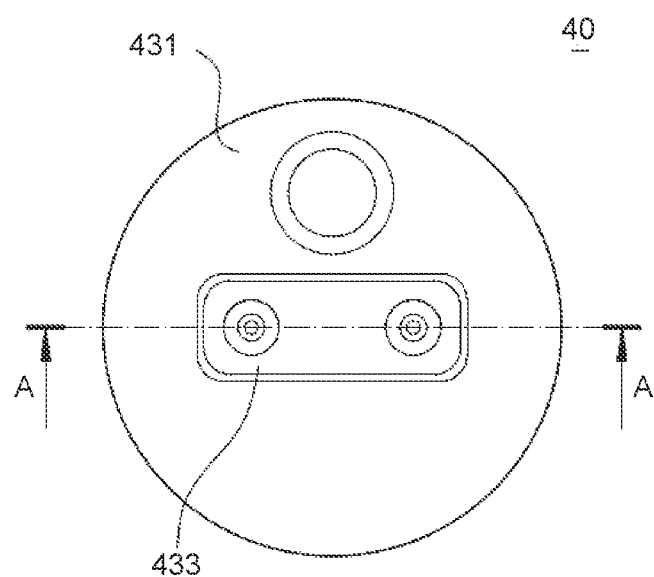
FIG. 7 is a schematic structural vertical view of a battery cell disclosed in an embodiment.
Figure 8:
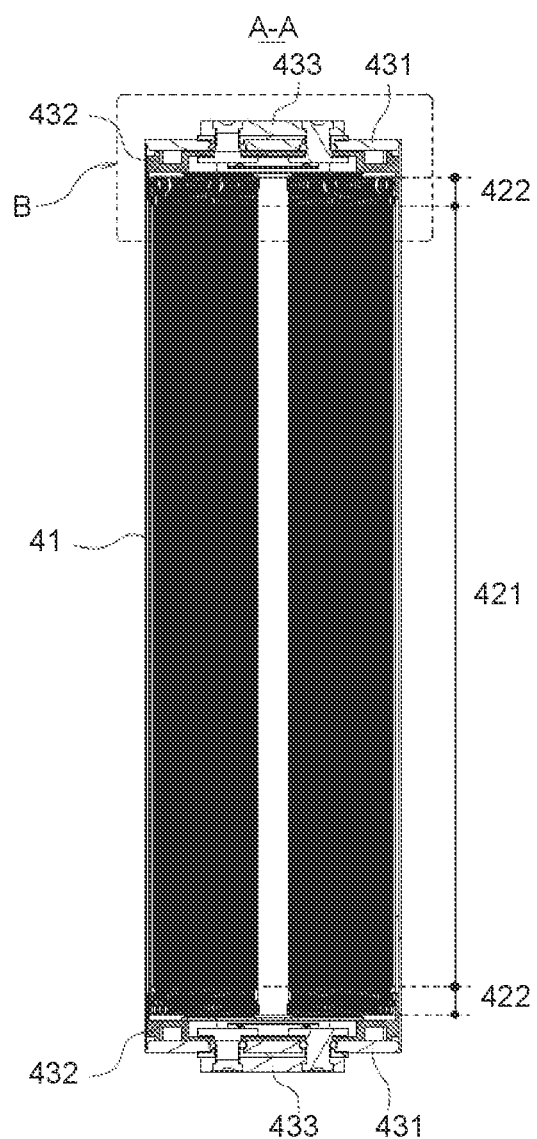
FIG. 8 is a schematic cross-sectional view of a structure along A-A in FIG. 7.

As shown in FIG. 7 and FIG. 8, the end cover 431 is connected to the housing 41 to cover the electrode assembly 42 in the housing 41. The first insulator 432 can isolate the electrode assembly 42 from the end cover 431. For example, the housing 41 has two opposite openings 411. Two end covers 431 respectively cover the two openings 411 and are both connected to the housing 41. The electrode assembly 42 has two opposite tabs 422. The two tabs 422 respectively extend from two ends 421a of the body portion 421. The two tabs 422 have opposite polarities. Two electrode terminals 433 are respectively connected to the two tabs 422. Two first insulators 432 are respectively connected to the two end covers 431.

Figure 9:
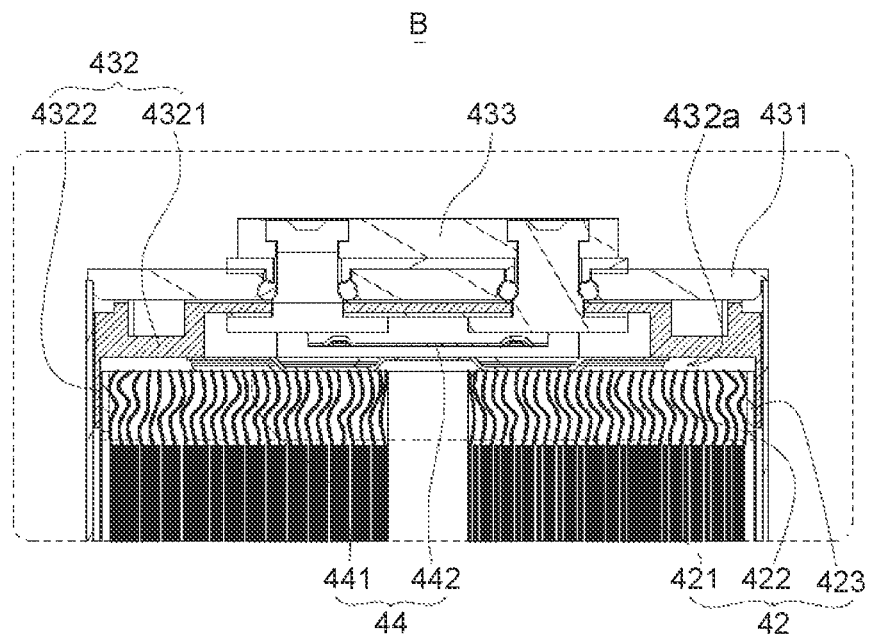
FIG. 9 is an enlarged view at B in FIG. 8.

As shown in FIG. 8 and FIG. 9, the electrode assembly 42 further includes an isolation portion 423. The isolation portion 423 is disposed on the periphery of the tab 422, so that the tab 422 is located on an inner side of the isolation portion 423. Herein, the inner side is a side farther away from the housing 41. The isolation portion 423 extends along a peripheral side of the tab 422. In the direction of the winding axis of the electrode assembly 42, the isolation portion 423 does not extend beyond the tab 422. The first insulator 432 in this embodiment has the concave portion 432a. The tab 422 extends toward inside of the concave portion 432a. At least part of the tab 422 is accommodated in the concave portion 432a of the first insulator 432. The first insulator 432 can limit and constrain the electrode assembly 42 to reduce the possibility of the electrode assembly 42 moving in the housing 41 caused by shock or vibration of the battery cell 40. The first insulator 432 is configured to abut against the isolation portion 423 to isolate the tab 422 from the housing 41. The first insulator 432 abuts against the isolation portion 423 to form an abutting area, and the tab 422 are located on an inner side of the abutting area. The first insulator 432 and the isolation portion 423 together form an isolation structure on the periphery of the tab 422 to isolate the tab 422 from the housing 41.

The battery cell 40 in this embodiment includes the housing 41, the electrode assembly 42, and the end cover assembly 43. The concave portion 432a of the first insulator 432 of the end cover assembly 43 accommodates the tab 422 of the electrode assembly 42. In addition, the first insulator 432 and the isolation portion 423 of the electrode assembly 42 abut against each other to form the isolation structure on the periphery of the tab 422, thereby isolating the tab 422 from the housing 41. In this way, during use of the battery cell 40, when the tab 422 is deformed by releasing its own elastic restoring force, if the tab 422 is in contact with the first insulator 432 and the isolation portion 423, the tab 422 is blocked by the first insulator 432 and the isolation portion 423, thereby effectively reducing the possibility of short circuit caused by the tab 422 coming into overlapping contact with the housing 41. In addition, because the first insulator 432 and the isolation portion 423 abut against each other, and at least part of the tab 422 is accommodated in the concave portion 432a of the first insulator 432, the tab 422 may be protected by the first insulator 432 and the isolation portion 423, so that an external conductive impurity is not easy to come into contact with the tab 422, thereby reducing the possibility of short-circuiting the tab 422 and the housing 41 due to the tab 422 and the housing 41 being conductively connected by the conductive impurity.

In some embodiments, as shown in FIG. 9, the first insulator 432 includes a body 4321 and an extension portion 4322 that are interconnected. The first insulator 432 is connected to the end cover 431 through the body 4321. For example, after the electrode terminal 433 is connected and fastened to the end cover 431, a part of the electrode terminal 433 is located on a side of the body 4321 farther away from the end cover 431 and applies a pressing force to the body 4321 toward the end cover 431. In this way, the first insulator 432 is connected to the end cover 431. The extension portion 4322 extends and protrudes from the body 4321 to the electrode assembly 42. The body 4321 is disposed intersecting the extension portion 4322. The body 4321 and the extension portion 4322 form the concave portion 432a. The extension portion 4322 is disposed on the periphery of the tab 422. The extension portion 4322 extends along the peripheral side of the tab 422. The first insulator 432 abuts against the isolation portion 423 through the extension portion 4322. The first insulator 432 may be connected and fastened to the end cover 431 in advance through the body 4321, and then the end cover 431 having the first insulator 432 is assembled with the housing 41.

Because the first insulator 432 has the extension portion 4322, during assembling, the extension portion 4322 of the first insulator 432 can insert into a gap between the tab 422 and the housing 41, so that the extension portion 4322 can guide the tab 422 into the concave portion 432a of the first insulator 432 accurately. This reduces the possibility that the tab 422 is deformed by the first insulator 432 applying a pressing force to the tab 422 during assembling, and allows the extension portion 4322 to protect and limit the tab 422 earlier during assembling. In this embodiment, at least part of the isolation portion 423 is located in the concave portion 432a. The extension portion 4322 abuts against, from an outer side of the isolation portion 423, a surface of the isolation portion 423 facing toward the housing 41, so that the extension portion 4322 and the isolation portion 423 can provide protective isolation for the tab 422 on the periphery of the tab 422. Herein, the outer side is a side proximate to the housing 41.

In some examples, the isolation portion 423 may be a separate structural member, and the isolation portion 423 needs to be assembled on the periphery of the tab 422. Alternatively, the isolation portion 423 is a part of the separator 42c that extends beyond the body portion 421 and is located on the periphery of the tab 422. During the winding process, part of the separator 42c extends beyond the first electrode plate 42a and the second electrode plate 42b. The part of the separator 42c extending beyond the first electrode plate 42a and the second electrode plate 42b (that is, the separator 42c wound alone for a predetermined quantity of turns at the end of the winding process as described above) also extends beyond the body portion 421 in an axial direction of the electrode assembly 42. The part of the separator 42c extending beyond the body portion 421 and located on the periphery of the tab 422 may be configured to form the isolation portion 423, so that no more additional isolation portion 423 needs to be disposed, thereby reducing a quantity of parts used and difficulty of assembling. In addition, because the separator 42c is of an integral structure, the formed isolation portion 423 is not easy to fall off.

In some examples, the isolation portion 423 may be of an annular structure with a central hole. The tab 422 runs through the central hole of the isolation portion 423. The isolation portion 423 integrally sleeves the periphery of the tab 422, so that the isolation portion 423 can form protection for the tab 422 in an entire circumferential direction of the tab 422.

In some examples, the first insulator 432 may be of a spherical-structured cover. A surface on which the concave portion 432a is formed on the first insulator 432 is a spherical surface, meaning that an inner wall of the concave portion 432a is a spherical surface.

Figure 10:
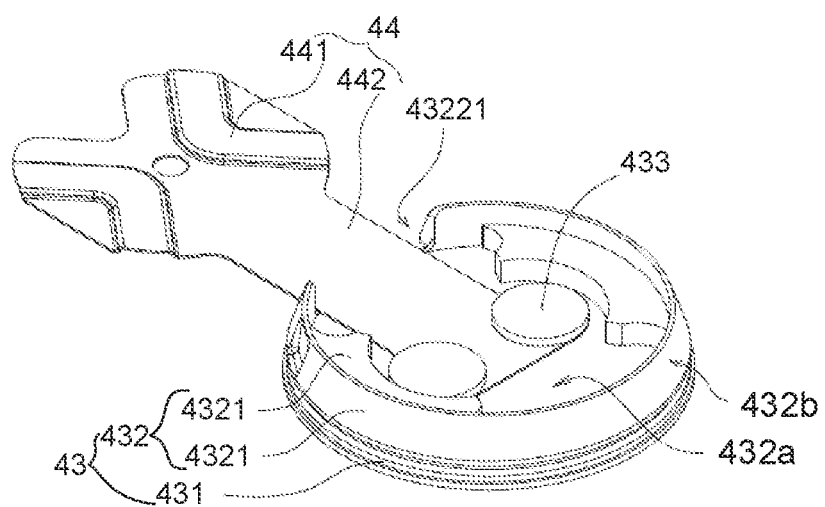
FIG. 10 is a schematic structural diagram of an end cover assembly disclosed in an embodiment.

In some embodiments, as shown in FIG. 9 and FIG. 10, the connecting piece 44 includes a first connecting portion 441 and a second connecting portion 442. The first connecting portion 441 is connected to the second connecting portion 442. The connecting piece 44 is connected to the tab 422 of the electrode assembly 42 through the first connecting portion 441. For example, the first connecting portion 441 is connected to the tab 422 through welding. The connecting piece 44 is connected to the electrode terminal 433 through the second connecting portion 442. For example, the second connecting portion 442 is connected to the electrode terminal 433 by using a rivet. As shown in FIG. 9, after the battery cell 40 is assembled, the first connecting portion 441 is in a bent state with respect to the second connecting portion 442. The first connecting portion 441 is located between the first insulator 432 and the electrode assembly 42 and is located in the concave portion 432*a*. The first insulator 432 and the electrode assembly 42 together press the first connecting portion 441, so that the first connecting portion 441 is not easy to move relative to the electrode assembly 42. This reduces the possibility that the first connecting portion 441 and the tab 422 are disconnected due to the first connecting portion 441 moving relative to the electrode assembly 42. In an example, the body 4321 of the first insulator 432 and the electrode assembly 42 together press the first connecting portion 441.

In some embodiments, FIG. 10 illustratively shows a state in which the connecting piece 44 is connected to the electrode terminal 433 but is not bent. As shown in FIG. 10, the extension portion 4322 is of an annular structure with a notch 43221, so that an end surface of the extension portion 4322 farther away from the end cover 431 is of an open-loop structure. The notch 43221 of the extension portion 4322 can avoid the second connecting portion 442. The second connecting portion 442 of the connecting piece 44 can run through the notch 43221. Therefore, during manufacturing process of the connecting piece 44, the first connecting portion 441 and the second connecting portion 442 of the connecting piece 44 remain flat, which can reduce processing steps of the connecting piece 44. Parts of the extension portion 4322 other than the notch 43221 may abut against the isolation portion 423.

Figure 11:
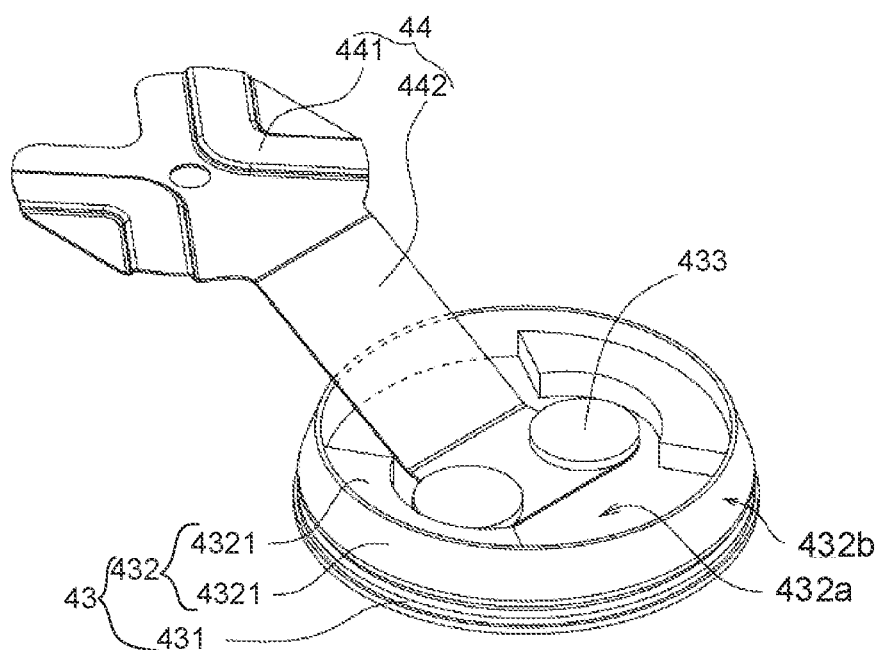
FIG. 11 is a schematic structural diagram of an end cover assembly disclosed in another embodiment.

In some embodiments, FIG. 11 illustratively shows a state in which the connecting piece 44 is connected to the electrode terminal 433 but is not bent. As shown in FIG. 11, the extension portion 4322 is of a continuously extending closed-loop structure, so that an end surface of the extension portion 4322 farther away from the end cover 431 is of a closed-loop structure. The first connecting portion 441 and the second connecting portion 442 of the connecting piece 44 need to be bent during manufacturing. In this way, after the second connecting portion 442 is connected to the electrode terminal 433, the connecting piece 44 can avoid the extension portion 4322. The extension portion 4322 may abut against the isolation portion 423, and because an end surface of the extension portion 4322 farther away from the end cover 431 is of a closed-loop structure, the extension portion 4322 can provide protective isolation for the tab 422 at an entire periphery of the tab 422, which can further improve the isolation effect. In an embodiment in which the isolation portion 423 is also of an annular structure, the extension portion 4322 abuts against the isolation portion 423 to form a continuously extending closed-loop isolation area, to isolate the tab 422 from the housing 41 at various positions in a circumferential direction of the tab 422.

Figure 12:
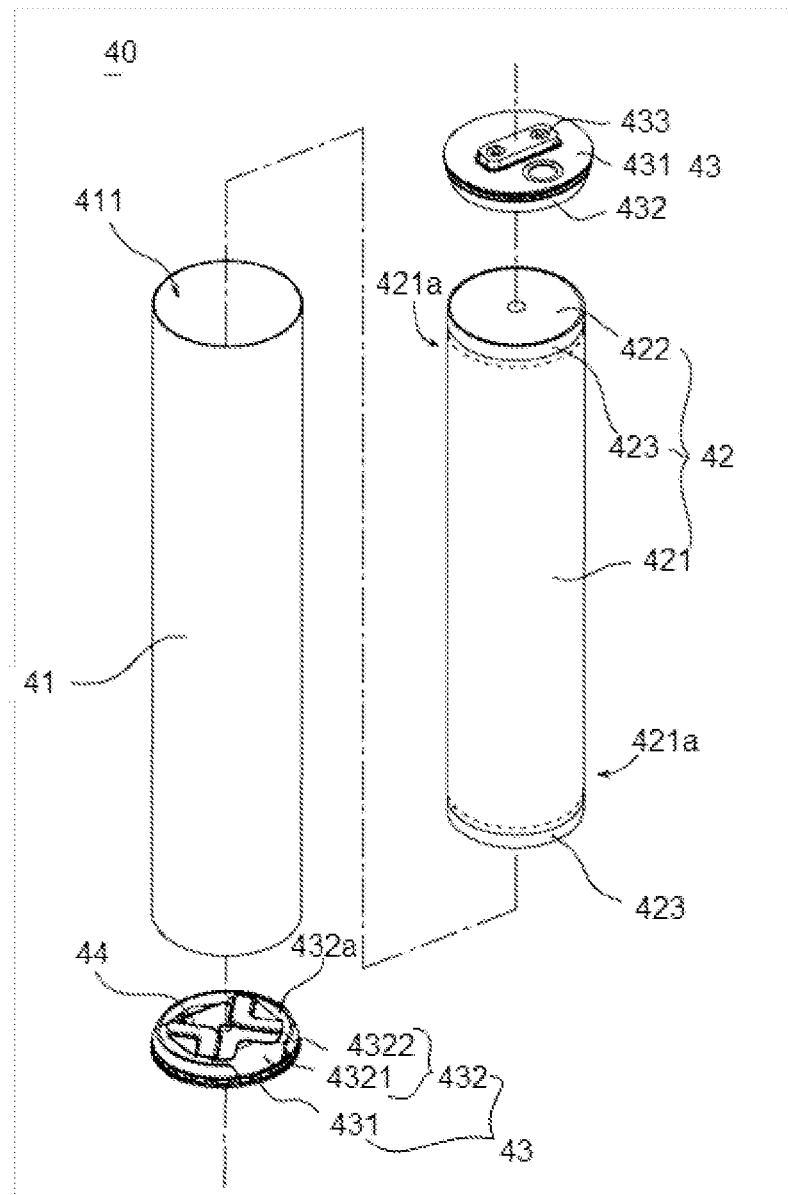
FIG. 12 is a schematic structural exploded view of a battery cell disclosed in another embodiment.
Figure 13:
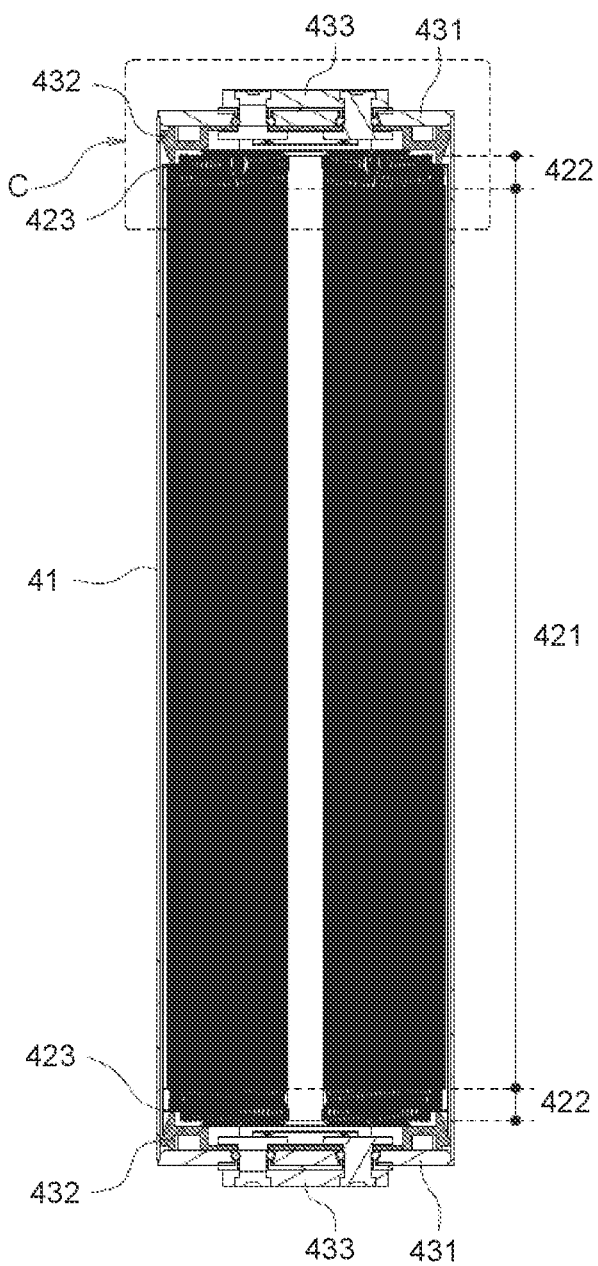
FIG. 13 is a schematic structural cross-sectional view of the battery cell in the embodiment shown in FIG. 12.
Figure 14:
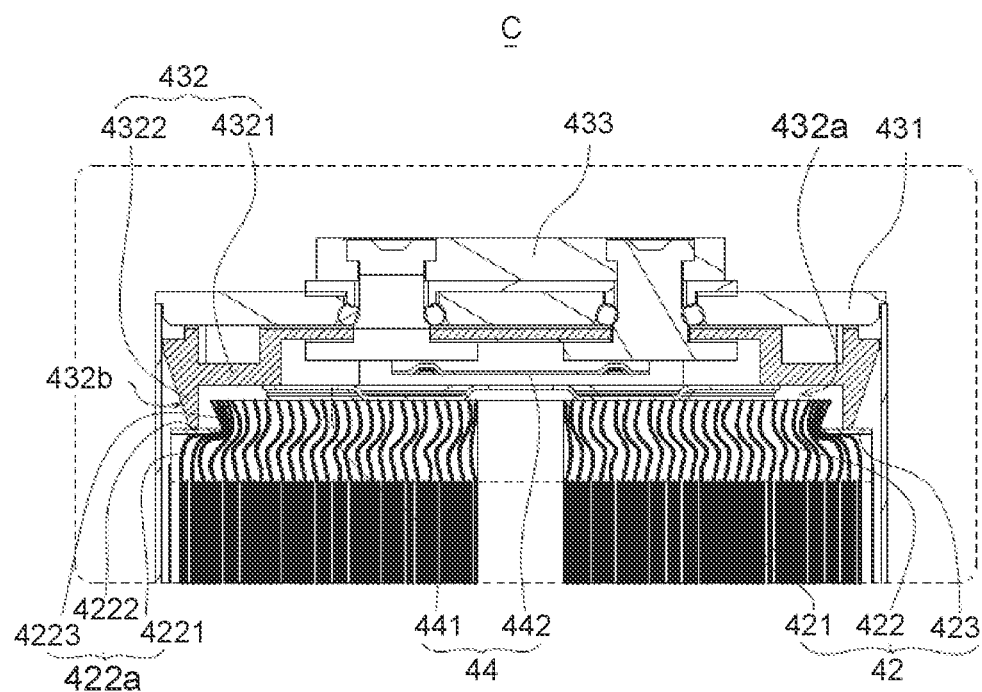
FIG. 14 is an enlarged view at C in FIG. 13.

In some embodiments, as shown in FIG. 12 to FIG. 14, the extension portion 4322 is located on a side of the isolation portion 423 closer to the end cover 431. The extension portion 4322 abuts against the isolation portion 423 in a direction leaving the end cover 431. One end of the extension portion 4322 farther away from the end cover 431 abuts against the isolation portion 423. In this way, the extension portion 4322 can limit and constrain the isolation portion 423, reducing the possibility of the isolation portion 423 moving in a direction approaching or leaving the end cover 431, thereby reducing the possibility of the extension portion 4322 and the isolation portion 423 being out of the abutting state due to the isolation portion 423 moving in the direction approaching or leaving the end cover 431. In addition, the extension portion 4322 can also limit and constrain the electrode assembly 42, reducing the possibility of the electrode assembly 42 moving in the direction approaching or leaving the end cover 431.

In some embodiments, as shown in FIG. 14, the tab 422 includes a step portion 422*a*. The step portion 422*a* includes a first side surface 4221, a transition surface 4222, and a second side surface 4223. The tab 422 includes a first extension section corresponding to the first side surface 4221 and a second extension section corresponding to the second side surface 4223. The first side surface 4221 is proximate to the body portion 421, and the second side surface 4223 is proximate to the end cover 431. The transition surface 4222 connects the first side surface 4221 and the second side surface 4223. The transition surface 4222 faces toward the end cover 431. A minimum radial dimension of the first side surface 4221 is greater than a maximum radial dimension of the second side surface 4223. That is, a minimum radial dimension of the first extension section is greater than a maximum radial dimension of the second extension section. A part of the tab 422 corresponding to the second side surface 4223 is located in the concave portion 432*a*. That is, the second extension section of the tab 422 is located in the concave portion 432*a*. In this way, part of the tab 422 may be located in the concave portion 432*a* of the first insulator 432, which can shorten, for the battery cell 40 with a same capacity, an overall dimension of the battery cell 40 in an axial direction of the electrode assembly 42, thereby helping improve an energy density of the battery cell 40. In an example, the extension portion 4322 is disposed surrounding the second side surface 4223. A part of an inner wall of the concave portion 432*a* corresponding to the extension portion 4322 surrounds the second side surface 4223.

Figure 15:
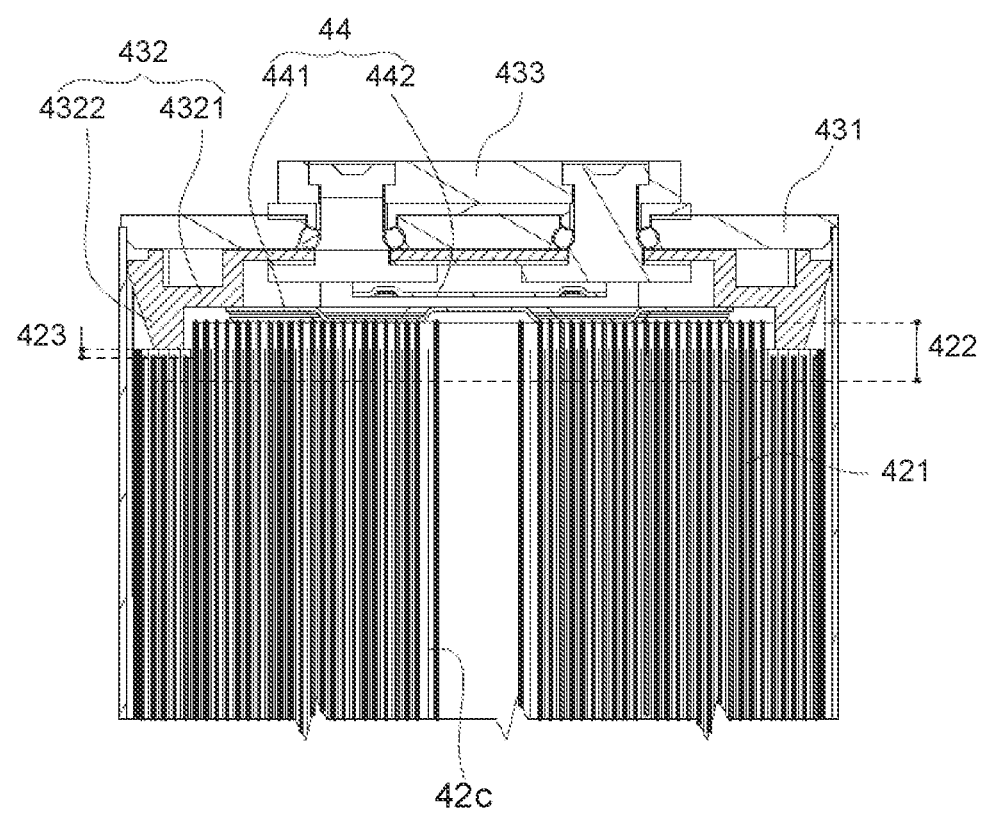
FIG. 15 is a schematic partial cross-sectional view of a battery cell disclosed in an embodiment.

In an example, as shown in FIG. 14, the entire tab 422 is flattened through a flattening process to form the step portion 422*a*. The isolation portion 423 is a separately disposed structural member. After the tab 422 is flattened, the isolation portion 423 is placed on the transition surface 4222, and the first insulator 432 abuts against the isolation portion 423. In another example, as shown in FIG. 15, before the electrode plate is wound, a part of the electrode plate to be formed with the second extension section is cut, so that a width of the part is smaller than widths of other parts of the electrode plate. After the electrode plate is wound, the second extension section is formed on the cut part and the first extension section is formed on an uncut part. A part of the separator 42*c* extending beyond the second extension section in an axial direction and located on a periphery of the first extension section may form the isolation portion 423.

In an example, the isolation portion 423 is disposed on the transition surface 4222. The end surface of the extension portion 4322 is opposite the transition surface 4222 and abuts against the isolation portion 423. Because the isolation portion 423 is located on the transition surface 4222 of the tab 422, when the extension portion 4322 applies an abutting force to the isolation portion 423, the isolation portion 423 can transmit the force to the transition surface 4222, so that the tab 422 can absorb the abutting force. This reduces the possibility of the electrode assembly 42 moving in the direction approaching or leaving the end cover 431, and also reduces the possibility of short circuit caused by the first electrode plate 42*a* coming into contact with the second electrode plate 42*b*, because the abutting force of the extension portion 4322 to the isolation portion 423 directly acts on the body portion 421 to cause misalignment between the body portion 421 and the separator 42*c*.

Figure 16:
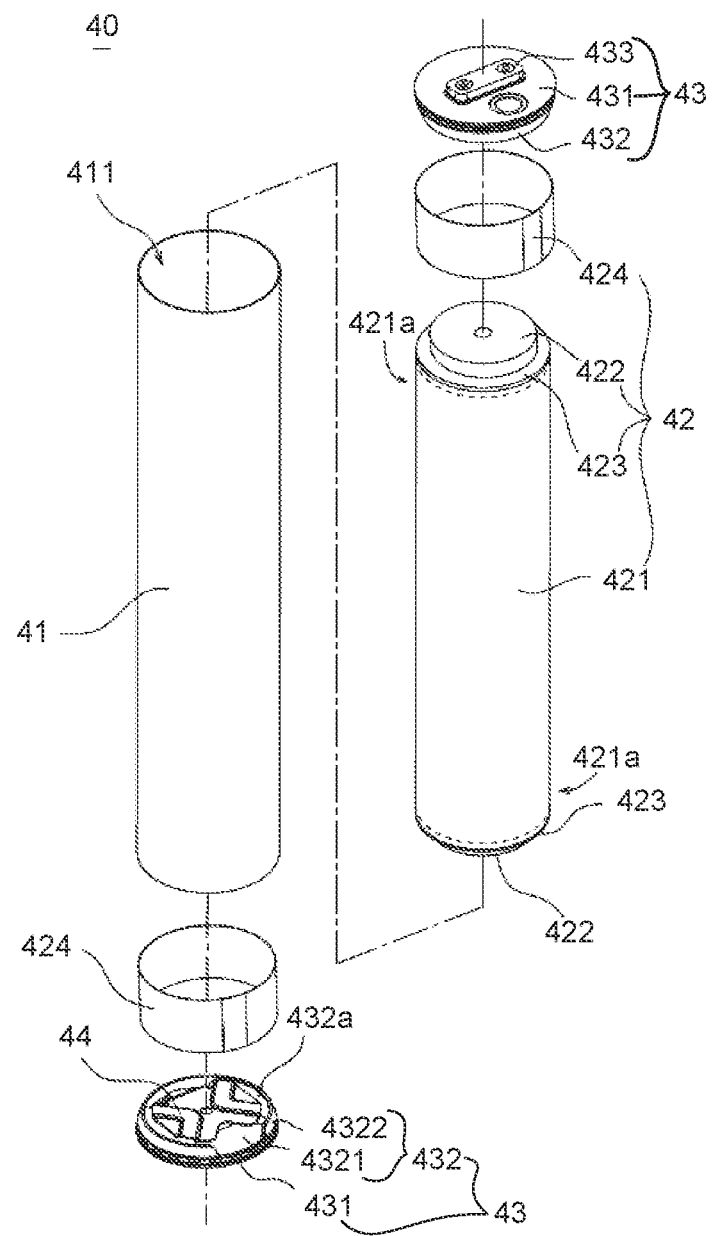
FIG. 16 is a schematic structural exploded view of a battery cell disclosed in another embodiment.
Figure 17:
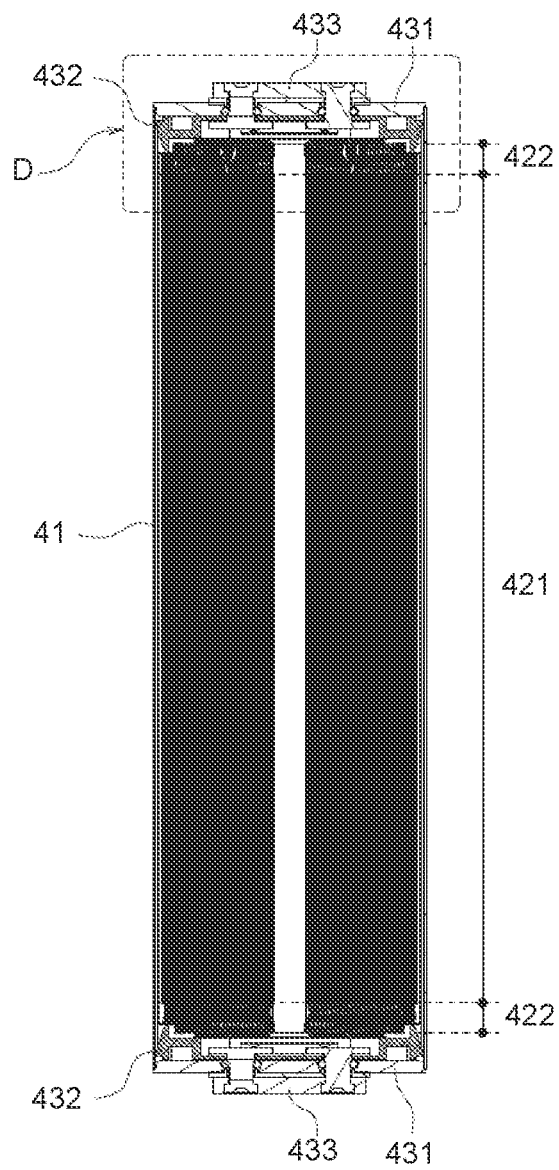
FIG. 17 is a schematic structural cross-sectional view of the battery cell in the embodiment shown in FIG. 16.
Figure 18:
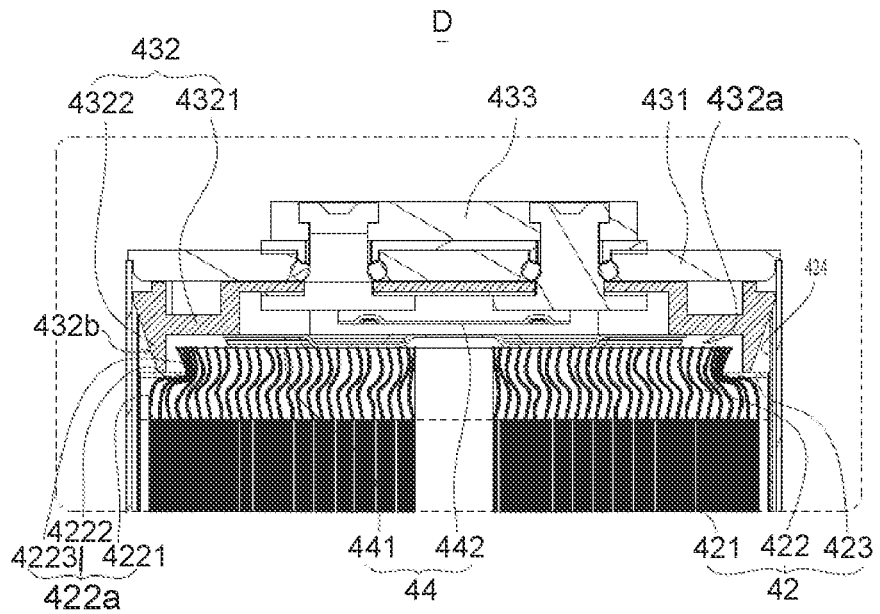
FIG. 18 is an enlarged view at D in FIG. 17.

In some embodiments, as shown in FIG. 16 to FIG. 18, the electrode assembly 42 further includes a second insulator 424. The second insulator 424 is disposed surrounding an abutting area between the first insulator 432 and the isolation portion 423 to isolate the abutting area between the first insulator 432 and the isolation portion 423 from the housing 41. In an example, the second insulator 424 forms an isolation structure outside the extension portion 4322 of the first insulator 432, to reduce the possibility of a conductive impurity entering the abutting area between the extension portion 4322 and the isolation portion 423, and also forms isolation protection for the tab 422, to reduce the possibility of the tab 422 coming into contact with the housing 41 when the extension portion 4322 and the isolation portion 423 are accidentally out of the abutting state. In this way, the abutting area between the extension portion 4322 and the isolation portion 423 and the second insulator 424 can form a structure that provides double isolation and protection for the tab 422, which can further reduce the possibility of short-circuiting the tab 422 and the housing 41 due to the tab 422 coming into contact with the housing 41. In an example, the second insulator 424 is of an annular structure. The second insulator 424 continuously extends along a peripheral side of the extension portion 4322, to form protection in an entire circumferential direction of the extension portion 4322.

In some examples, the second insulator 424 may be a separate structural member. Two second insulators 424 are respectively disposed corresponding to two tabs 422. During assembling, the second insulator 424 needs to be assembled to the periphery of the tab 422 in advance, and the second insulator 424 does not cover the body portion 421. Then, the electrode assembly 42 with the second insulator 424 is placed into the housing 41. Alternatively, the second insulator 424 may be a separate structural member. The second insulator 424 is of a barrel-shaped structure. The second insulator 424 wraps the body portion 421 and the tab 422. A part of the second insulator 424 extending beyond the body portion 421 surrounds the abutting area between the first insulator 432 and the isolation portion 423.

In some embodiments, the first insulator 432 has an outer surface 432b facing toward the housing 41. The second insulator 424 abuts against the outer surface 432b of the first insulator 432 facing toward the housing 41 and is in contact with the isolation portion 423, so that a contact area can be formed between the second insulator 424 and the first insulator 432 and a contact area can be formed between the second insulator 424 and the isolation portion 423. In this way, the second insulator 424 can block a conductive impurity, further reducing the possibility that the conductive impurity enters from a gap between the second insulator 424 and the first insulator 432 or a gap between the second insulator 424 and the isolation portion 423 into a gap between the second insulator 424 and the extension portion 4322, and then enters the abutting area between the extension portion 4322 and the isolation portion 423.

In some examples, the outer surface 432b of the first insulator 432 has a guide slope. The guide slope is inclined to the concave portion 432a in a direction leaving the end cover 431. In this way, during assembling of the end cover assembly 43 after the electrode assembly 42 having the second insulator 424 is placed into the housing 41, under the guidance of the guide slope, a part of the first insulator 432 corresponding to the guide slope can easily enter a space limited by the second insulator 424, which can reduce the possibility that the first insulator 432 directly abuts against the second insulator 424 to cause the second insulator 424 to collapse and further deprive the second insulator 424 of the isolation function. In an embodiment in which the first insulator 432 includes the body 4321 and the extension portion 4322, the guide slope disposed on the first insulator 432 makes an outer peripheral surface of the extension portion 4322 in a tapered shape.

In some examples, the second insulator 424 is adhered to the outer surface 432b of the first insulator 432. This can improve connection reliability and stability between the second insulator 424 and the first insulator 432, and reduce the possibility that the second insulator 424 and the first insulator 432 are out of the contact state due to shock, vibration, and other operating conditions during use of the battery cell 40. For example, the second insulator 424 may be adhered to the outer surface 432b of the first insulator 432 by using a tape or an adhesive.

In some examples, an area of the second insulator 424 abutting against the outer surface 432b of the first insulator 432 is closer to the end cover 431 than the tab 422, so that a contact area between the second insulator 424 and the first insulator 432 is closer to the end cover 431. During assembling, the first insulator 432 can come into contact with the second insulator 424 more quickly, so that the first insulator 432 can come into contact with the second insulator 424 before abutting against the isolation portion 423, thereby reducing the possibility that during the assembling, a conductive impurity enters the tab 422 from a gap between the first insulator 432 and the second insulator 424 that are not in contact with each other.

The battery cell 40 in the embodiments includes the electrode assembly 42 having the tab 422 and the isolation portion 423 and the first insulator 432 having the concave portion 432a. The isolation portion 423 is disposed along the peripheral side of the tab 422. After the battery cell 40 is assembled, at least part of the tab 422 is accommodated in the concave portion 432a, and the first insulator 432 abuts against the isolation portion 423, so that the first insulator 432 and the isolation portion 423 can isolate the tab 422 from the housing 41. In this way, during use of the battery cell 40, in a case that the tab 422 is deformed by releasing an elastic restoring force accumulated by itself, and the tab 422 encounters the first insulator 432 and the isolation portion 423, the tab 422 is limited and constrained by the first insulator 432 and the isolation portion 423, so that the tab 422 is not easy to come into contact with the housing 41, thereby reducing the possibility of short circuit of the battery cell 40 caused by the tab 422 coming into contact with the housing 41.

Figure 19:
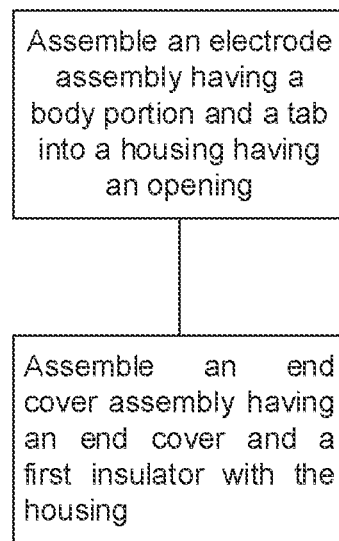
FIG. 19 is a flowchart of a manufacturing method of battery cell according to an embodiment.

As shown in to FIG. 19, based on the battery cell 40 in the foregoing embodiments, an embodiment further provides a manufacturing method of the battery cell 40, including:

placing the electrode assembly 42 having the body portion 421, the tab 422, and the isolation portion 423 into the housing 41 having the opening 411, where the tab 422 extends from the end 421a of the body portion 421 to the opening 411, and the isolation portion 423 is disposed on the periphery of the tab 422; and assembling the end cover assembly 43 having the end cover 431 and the first insulator 432 with the housing 41, where the end cover 431 covers the opening 411 and is connected to the housing 41, the first insulator 432 is located on a side of the end cover 431 proximate to the inside of the housing 41, the first insulator 432 has the concave portion 432a, at least part of the tab 422 is accommodated in the concave portion 432a, and the first insulator 432 abuts against the isolation portion 423 to isolate the tab 422 from the housing 41.

In the battery cell 40 manufactured by using the manufacturing method of the battery cell 40 in this embodiment, the electrode assembly 42 having the body portion 421, the tab 422, and the isolation portion 423 is placed into the housing 41, and the tab 422 faces toward the opening 411 of the housing 41. The end cover assembly 43 having the end cover 431 and the first insulator 432 having the concave portion 432a is assembled with the housing 41, and at least part of the tab 422 is accommodated in the concave portion 432a of the first insulator 432, so that the first insulator 432 abuts against the isolation portion 423. According to a structural design in which the first insulator 432 and the isolation portion 423 can isolate the tab 422 from the housing 41, during use of the battery cell 40, when the tab 422 is deformed by releasing an elastic restoring force accumulated by itself, and the tab 422 encounters the first insulator 432 and the isolation portion 423, the tab 422 is limited and constrained by the first insulator 432 and the isolation portion 423, so that the tab 422 is not easy to come into contact with the housing 41, thereby reducing the possibility of short circuit of the battery cell 40 caused by the tab 422 coming into contact with the housing 41.

Figure 20:
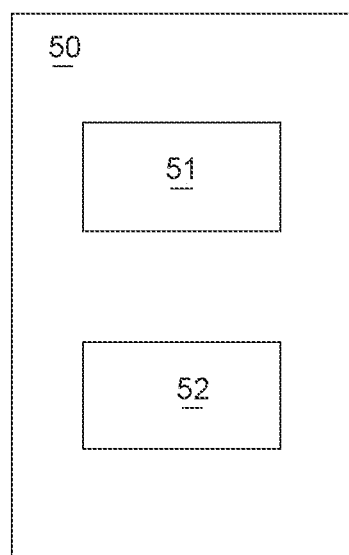
FIG. 20 is a schematic diagram of a manufacturing system of battery cell according to an embodiment.

As shown in to FIG. 20, based on the battery cell 40 in the foregoing embodiments, an embodiment further provides a manufacturing system 50 of the battery cell 40, including:

a first assembling apparatus 51, configured to place the electrode assembly 42 having the body portion 421, the tab 422, and the isolation portion 423 into the housing 41 having the opening 411, where the tab 422 extends from the end 421a of the body portion 421 to the opening 411, and the isolation portion 423 is disposed on the periphery of the tab 422; and a second assembling apparatus 52, configured to assemble the end cover assembly 43 having the end cover 431 and the first insulator 432 with the housing 41, where the end cover 431 covers the opening 411 and is connected to the housing 41, the first insulator 432 is located on a side of the end cover 431 proximate to the inside of the housing 41, the first insulator 432 has the concave portion 432a, at least part of the tab 422 is accommodated in the concave portion 432a, and the first insulator 432 abuts against the isolation portion 423 to isolate the tab 422 from the housing 41.

Although this disclosure has been provided with reference to various embodiments, various modifications can be made without departing from the scope of this present disclosure and the components therein can be replaced with equivalents. In particular, as long as there is no structural conflict, the various technical features mentioned in the embodiments can be combined in any manner. One skill in the art will understand that the present disclosure is not limited to the embodiments disclosed herein.

What is claimed is:

1. A battery cell, comprising:
   a housing, providing an opening;
   an electrode assembly, disposed in the housing, wherein the electrode assembly comprises a body portion, a tab, and an isolation portion, wherein the tab extends from an end of the body portion to the opening, and the isolation portion is disposed on a periphery of the tab and the isolation portion does not extend beyond the tab in a length direction of the tab such that the isolation portion does not extend the entire body length of the electrode assembly; and
   an end cover assembly, configured to close the opening, wherein the end cover assembly comprises an end cover and a first insulator,
   the end cover being configured to cover the opening and connected to the housing, and
   the first insulator being disposed on a side of the end cover proximate to an inside of the housing, the first insulator having a concave portion, at least one part of the tab being accommodated in the concave portion, and the first insulator being configured to abut against the isolation portion to isolate the tab from the housing; and, wherein
   the first insulator comprises a body and an extension portion that are interconnected, the body being configured to be connected to the end cover, the extension portion extending and protrudes from the body to the electrode assembly to form the concave portion, the extension portion being disposed on the periphery of the tab, and the extension portion abutting against the isolation portion, wherein the body of the first insulator is disposed on the tab proximate to the opening of the housing.

2. The battery cell according to claim 1, wherein the isolation portion is annular.

3. The battery cell according to claim 1, wherein the extension portion is located on a side of the isolation portion proximate to the end cover, and the extension portion abuts against the isolation portion in a direction leaving the end cover.

4. The battery cell according to claim 1, wherein the extension portion is of a continuously extending closed-loop structure or an annular structure with a notch.

5. The battery cell according to claim 1, wherein the tab comprises a step portion, the step portion comprising a first side surface, a transition surface, and a second side surface, the first side surface being proximate to the body portion, the transition surface connecting the first side surface and the second side surface, the transition surface facing toward the end cover, a minimum radial dimension of the first side surface being greater than a maximum radial dimension of the second side surface, and at least one part of an inner wall of the concave portion surrounding the second side surface.

6. The battery cell according to claim 5, wherein the extension portion surrounds the second side surface, and the isolation portion is disposed on the transition surface.

7. The battery cell according to claim 5, wherein the electrode assembly comprises a first electrode plate, a second electrode plate, and a separator, the first electrode plate and the second electrode plate each having a coated area and an uncoated area, a part of the electrode assembly corresponding to the coated areas of the first electrode plate and the second electrode plate being the body portion, the uncoated area of the first electrode plate or the second electrode plate forming the tab, the separator being configured to isolate the first electrode plate from the second electrode plate.

8. The battery cell according to claim 1, wherein the electrode assembly further comprises a second insulator, and the second insulator surrounding an abutting area between the first insulator and the isolation portion to isolate the abutting area from the housing.

9. The battery cell according to claim 8, wherein the second insulator abuts against an outer surface of the first insulator facing toward the housing and is in contact with the isolation portion.

10. The battery cell according to claim 9, wherein the outer surface has a guide slope, and the guide slope is inclined to the concave portion in a direction leaving the end cover.

11. The battery cell according to claim 9, wherein the second insulator is adhered to the outer surface.

12. The battery cell according to claim 9, wherein an area of the second insulator abutting against the outer surface is closer to the end cover than to the tab.

13. The battery cell according to claim 1, wherein the end cover assembly further comprises a connecting piece, the connecting piece is accommodated in the concave portion, the connecting piece comprises a first connecting portion, the first connecting portion is configured to be connected to the tab, and the first insulator and the electrode assembly presses the first connecting portion.

14. A battery, comprising the battery cell of claim 1.

15. An electric apparatus, comprising the battery cell of claim 1, wherein the battery cell is configured to supply electric energy.

* * * * *